(12) United States Patent
Seidler et al.

(10) Patent No.: US 9,089,821 B2
(45) Date of Patent: Jul. 28, 2015

(54) BEATER TOOL FOR A STAND MIXER COMPRISING A SCRAPER

(75) Inventors: Mark Seidler, Havant (GB); Keith Leaman, Havant (GB)

(73) Assignee: KENWOOD LIMITED, Havant, Hampshire (GB)

( * ) Notice: Subject to any disclaimer, the term of this patent is extended or adjusted under 35 U.S.C. 154(b) by 183 days.

(21) Appl. No.: 13/697,459

(22) PCT Filed: May 6, 2011

(86) PCT No.: PCT/GB2011/000694
§ 371 (c)(1),
(2), (4) Date: Jan. 16, 2013

(87) PCT Pub. No.: WO2011/141690
PCT Pub. Date: Nov. 17, 2011

(65) Prior Publication Data
US 2013/0135964 A1   May 30, 2013

(30) Foreign Application Priority Data
May 13, 2010  (GB) .................................. 1007979.6

(51) Int. Cl.
*B01F 7/00* (2006.01)
*B01F 13/00* (2006.01)
*A47J 43/07* (2006.01)

(52) U.S. Cl.
CPC ........... *B01F 7/0005* (2013.01); *A47J 43/0711* (2013.01); *B01F 7/00208* (2013.01); *B01F 7/00275* (2013.01); *B01F 7/00583* (2013.01)

(58) Field of Classification Search
CPC .. B01F 7/00308; B01F 13/002; B01F 7/0005; A47J 43/0711
USPC .................. 366/309, 279, 254, 253, 312, 343
See application file for complete search history.

(56) References Cited

U.S. PATENT DOCUMENTS

| 2,178,269 A | 10/1939 | Seybert |
| 4,337,000 A * | 6/1982 | Lehmann ...................... 366/288 |

(Continued)

FOREIGN PATENT DOCUMENTS

| GB | 483800 A | 4/1938 |
| WO | 2005/089606 | 9/2005 |

(Continued)

OTHER PUBLICATIONS

IPER of PCT/GB2011/000694 dated Nov. 13, 2012.
International Search Report for PCT/GB2011/000694 of WO2011141690 published Nov. 17, 2011.
Written Opinion of PCT/GB2011/000694 filed May 6, 2011.
UK Search Report of GB1007979.6, searched on Sep. 21, 2010.
Russian Office Action dated Dec. 12, 2014 for Russian Patent Application No. 2012153761/12 (related application).

*Primary Examiner* — Tony G Soohoo
*Assistant Examiner* — Anshu Bhatia
(74) *Attorney, Agent, or Firm* — Paul D. Bianco; Martin Fleit; Fleit Gibbons Gutman Bongini & Bianco PL

(57) ABSTRACT

Beater assembly for mixing ingredients in the bowl of a stand mixer with planetary drive, the assembly (10) including upright arm members (12, 14) which repeatedly approach and pass close to the walls of the bowl in accordance with the motion imparted by the planetary drive. The arm members are provided with flexible wiping or scraping blades (22) which are capable of adapting themselves to fully conform to the bowl surface, each arm member (12, 14) is grooved (24) along its length and each blade (22) is formed of a length-wise resilient elastomer configured for mounting in the groove. The blades are formed at each end with fasteners (34, 36) and are held in position, under length-wise tension, by interlocking the fasteners with anchoring devices (38, 40) located near the ends of the arm members.

20 Claims, 5 Drawing Sheets

(56) References Cited

U.S. PATENT DOCUMENTS

| | | |
|---|---|---|
| 5,584,112 A | 12/1996 | Diore et al. |
| 7,314,308 B2 | 1/2008 | Fallowes |
| 8,267,573 B2 | 9/2012 | Wilson |
| 2006/0171251 A1* | 8/2006 | Busick .................... 366/312 |
| 2006/0209629 A1* | 9/2006 | Fallowes et al. ............ 366/312 |
| 2006/0268659 A1 | 11/2006 | Kaas |
| 2007/0064523 A1 | 3/2007 | Wilson |

FOREIGN PATENT DOCUMENTS

| | | |
|---|---|---|
| WO | 2006/083560 | 10/2006 |
| WO | 2007/007202 | 1/2007 |
| WO | 2007007202 | 1/2007 |
| WO | 2011/141690 A4 | 11/2011 |

* cited by examiner

BEATER TOOL FOR A STAND MIXER COMPRISING A SCRAPER

FIELD OF THE INVENTION

This invention relates to a beater assembly for a stand mixer.

BACKGROUND OF THE INVENTION

Stand mixers are well known and versatile kitchen appliances which generally (though not necessarily) comprise a somewhat C-shaped casing, including a support for a bowl in which ingredients are to be mixed, an upright section and a header portion which is supported by the upright section so as to dispose, overhead of the bowl, a socket housing a drive outlet capable of imparting rotational drive to a shaft inserted into the socket and coupled to the drive outlet. The drive outlet socket faces down towards the bowl and can accommodate, by temporary insertion thereinto, shafts of various tools designed to couple to the drive outlet and devised for such purposes as whisking, blending, kneading and beating ingredients. The drive outlet is configured to impart a planetary drive motion to tools attached thereto; whereby a tool is rotated about an axis and also processes around a circular path centered on the axis.

The beater tool is particularly useful, as it can perform a number of tasks, and such tools have evolved into a format whereby a pair of substantially rigid arm members, shaped to substantially conform to the profile of the inner upright surface and a portion of the base of the mixing bowl, are formed into a rigid frame structure by joining together their lower parts and providing a transversely-extending upper support, linking the upper parts of the arm members and supporting at its centre an upwardly-directed drive shaft, or a receptor for such a shaft; the shaft being in any event intended for insertion into the drive socket to couple with the drive outlet.

Such beater tools work reasonably well in general use. However, production tolerances make it difficult to ensure that the arm members of the beater accurately match the inner surface of the bowl. Accordingly, particularly when material of a clingy nature is being mixed, a problem can arise in that there is a tendency for some of the material to adhere to the surface of the bowl so that it is not thoroughly incorporated into the mixture being made.

GB 483,800 disclosed, as long ago as 1938, that this problem could be addressed by providing the arm members of the beater with flexible scraping members capable of adapting themselves to fully conform to the bowl surface, and thus provide a complete and systematic scraping or wiping action in order to remove adhering material from the surface of the bowl and redirect it back into the mixture. This "flexi-beater" concept has been revisited in recent years, as described for example in U.S. Pat. No. 7,314,308 to Fallowes et al, WO 2007/007202 to Kaas and WO 2006/083560 to Busick, but practical problems still exist in relation to fitting the scraping members to the arm members whilst allowing for cleaning, economical replacement of worn or damaged scraping members and/or the use of exchangeable scraping members with different operating characteristics, and it is an aim of this invention to address one or more of these problems.

SUMMARY OF THE INVENTION

According to the invention there is provided a beater assembly for beating ingredients contained in a bowl supported under a planetary drive outlet of a stand mixer; the beater assembly comprising first and second arm members intended to depend into the bowl, and each configured so as to substantially follow the shape of the upright wall of the bowl; the arm members being further configured to adjoin near the base of the bowl, and the assembly further comprising a transverse member linking the non-adjoined ends of the arm members and supporting a shaft configured for temporary attachment to the planetary drive outlet of the stand mixer; the arm members being grooved along their length and each being provided with a respective anchoring device near its junction with said transverse member; and the assembly further comprising a blade member formed of a length-wise resilient elastomer and configured for mounting in said groove; the blade member comprising fasteners at its ends whereby the blade member can be secured to said arm members by interlocking of said fasteners with said anchoring devices; the retention of said blade member in said groove being enhanced by the length-wise resilience of said elastomer. This arrangement provides all of the benefits of a wiping beater and additionally permits the blade member to be readily removed for cleaning or replacement.

The ready removal and replacement of the blade member not only facilitates cleaning of the separate components and the economic replacement of worn or damaged blade members, but also advantageously permits the use, with the same beater assembly, of alternative blade members having wiper blades with differing characteristics, designed for use with, say, mixtures of widely different stiffness and/or with bowls made of different materials. Blade members intended for different applications are preferably made visually distinct, for example by colour coding, to aid user differentiation.

It will be appreciated that the invention provides a form of beater in which all parts may be cleaned in a dishwasher or by hand; the main body of the beater, comprising the first and second arm members and the transverse member, being made either from metallic material, such as stainless steel, or from a plastics material such as a polymer.

The first and second arm members and the transverse member are preferably formed as an integral framework.

The blade member preferably comprises a relatively thick root portion, configured to sit snugly in said groove, and an outwardly extending wiping part of thinner profile and formed to repeatedly flex when repeatedly wiped against the interior wall of the bowl during the planetary mixing motion.

In preferred embodiments of the invention, at least a major portion of the wiping part of the blade member has a thickness of 3.0 mm or more, and a length of 10.0 mm or more; the use of such dimensions providing unexpectedly good wear and damage resistance allied to good conformance to the bowl profile, as well as providing a substantial creaming surface. Indeed, it is considered that the use of such dimensions is inventive of itself and, accordingly, a further and independent feature of the invention provides for the incorporation, into beater assemblies generally, of blade members having wiping parts major portions at least of which conform to such dimensions.

Returning to specific embodiments and irrespective of whether or not the aforementioned preferred dimensions are employed, it is further preferred that the wiping part of the blade member is split, substantially centrally of the blade member's length, to more readily accommodate opposing flexure forces applied to the first and second arms of the beater during use.

In a particularly preferred form of the invention, walls defining the groove in said first and second arm members are cut away at or near the adjoined ends of said arm members to form a shaped cut-out, and said root portion of the blade member is thickened, substantially centrally of the length of said blade member, in a shape conforming to, and adapted to locate within, said cut-out. The cut-out may conveniently conform to a keystone-like shape.

In further preferred embodiments of the invention, the anchoring means may comprise undercut terminations of the walls defining the groove in the first and second arms, and the fasteners on said blade member may comprise tab-like terminations extending from said root portions and formed with lateral walls shaped to engage with said undercut terminations of the walls to hold the blade member in tension, stretched along said groove with its root portion snugly located therein.

In alternative embodiments, the anchoring means may comprise hook members formed on the first and second arm members or on said transverse member, and the fasteners may comprise apertured tab-like members extending from said root portion of the blade member, such that the apertured tab members can be fitted over the hook members to anchor the ends of the blade members, thereby to hold the blade member in tension, stretched along said groove with its root portion snugly located therein.

The shaft for driving the beater assembly may be integrally formed with the transverse member. Preferably, however, the transverse member is formed with a fitment, such as a screw-threaded socket, into which a shaft can be fitted and secured.

The beater assembly may be substantially flat in profile (i.e. the centre line of the groove may lie in a single plane), but it is preferred that the arm members are azimuthally twisted as this enhances the performance of the assembly in terms of encouraging ingredients that might otherwise escape upwards from the bowl area swept by the blade members, to move downwards for reincorporation into the mixture.

Where azimuthally twisted arm members are used, it is preferred to form the blade members flat, and to rely upon their resilience to enable them to conform to the azimuthal shape upon attachment to the arm members. The blades may be pre-shaped however, if desired, or if necessary to ease conformance to the azimuthal shape.

In preferred embodiments of the invention, no cross-bracing members are provided between the arm members. This provides an open-framework construction that is easier to clean than cross-braced frameworks and moreover avoids a disadvantage of cross-braced frameworks, whereby ingredients are undesirably collected on the cross-braces during use, meaning that the mixing process has to be interrupted for cleaning, from time to time.

Beater assemblies in accordance with the invention may be used both with conventional stand mixers and the more recently developed stand mixers which are capable of heating materials being mixed in the bowl. When used with such heated stand mixers, however, the invention is particularly beneficial since the intimate contact between the blade member and the bowl reduces the risk of ingredients burning and/or sticking to the bottom of the bowl if they become too hot.

BRIEF DESCRIPTION OF THE DRAWINGS

In order that the invention may be clearly understood and readily carried into effect, one embodiment of the invention will now be described, by way of example only, with reference to the accompanying drawings, of which.

DETAILED DESCRIPTION OF THE INVENTION

Figure 1:
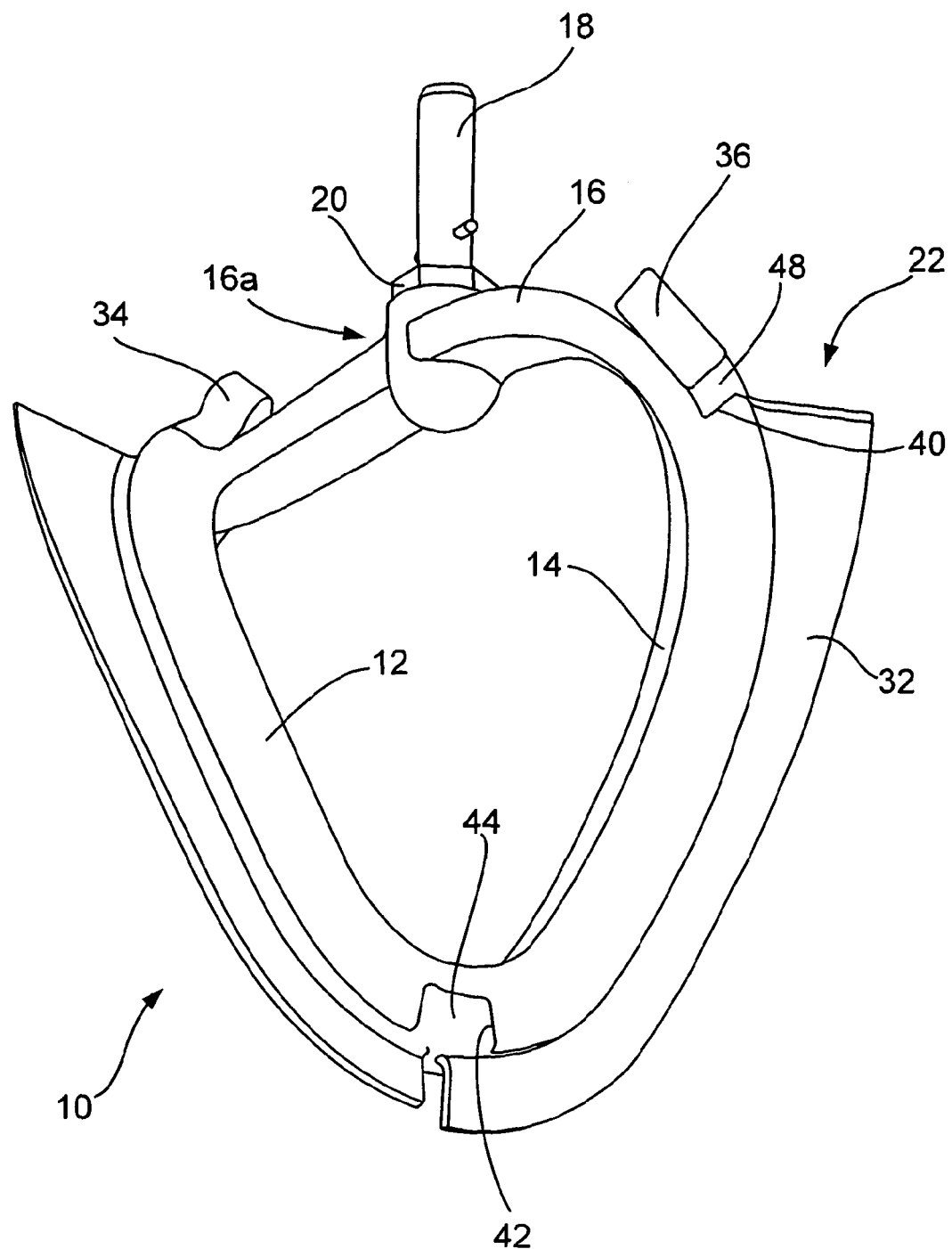
FIG. 1 shows, in perspective view, a beater assembly in accordance with one embodiment of the invention.

Referring now to the drawings, a beater assembly in accordance with one example of the invention is shown at 10. As aforementioned, the assembly 10 is intended for use in a stand mixer 100 with planetary drive 102. In this example, the beater assembly 10 comprises an integral framework formed of first and second arm members 12 and 14 and a transverse member 16. It will be appreciated that, although it is convenient for the purposes of description herein, to refer to the members 12, 14 and 16 as separate entities, they are in this embodiment (and, indeed, preferably) integrally formed, either of a high-strength plastics material such as a polymer or of a metallic material such as stainless steel.

The transverse member 16 is provided in its central region 16a with a threaded socket; the socket being configured to accommodate a stub shaft 18 which is screwed into the threaded socket and fixed in place with a lock-nut 20. The shaft 18 is adapted at its upper, free, end to fit into the drive socket of a stand mixer and to couple to a planetary drive outlet therein; thereby, in known manner, to simultaneously rotate the beater assembly about the axis of the shaft 18 and cause it to process around a circular orbit centred on the shaft axis. The length of the shaft 18, and thus the operating height of the beater assembly relative to the base of a mixing bowl, can be varied somewhat, if desired, by releasing the lock-nut 20, screwing the shaft 18 into or out of the socket and re-tightening the lock-nut 20.

A flexible, wiping blade member 22 is releasably secured to the edges of the arm members 12 and 14, in a manner that will be made clear hereinafter. This wiping member 22 is made of an elastomeric material which is length-wise resilient and can thus be stretched into place and, once properly anchored, is self-retaining. The wiping blade member 22 makes repeated, intimate wiping contact with the interior sides of a bowl in which ingredients are being mixed as the beater assembly executes its planetary mixing motion. The repeated intimate contact is effective to cream soft mixes, such as margarine with sugar, and to move back into the mix ingredients that would otherwise have adhered to the walls and/or the base of the mixing bowl. Furthermore, if the stand mixer with which the assembly is used is capable of heating ingredients being mixed, the repeated intimate wiping contact reduces the risk of ingredients sticking to the bottom of the bowl and/or burning on.

It will be appreciated that the elastomeric material forming the wiping member 22 must be suitable for food contact, resistive of high temperatures, non-hydrolytic, and resistant to hot water and detergents; as, of course, must be the plastics or metallic material forming the framework 12, 14, 16.

Figure 2:
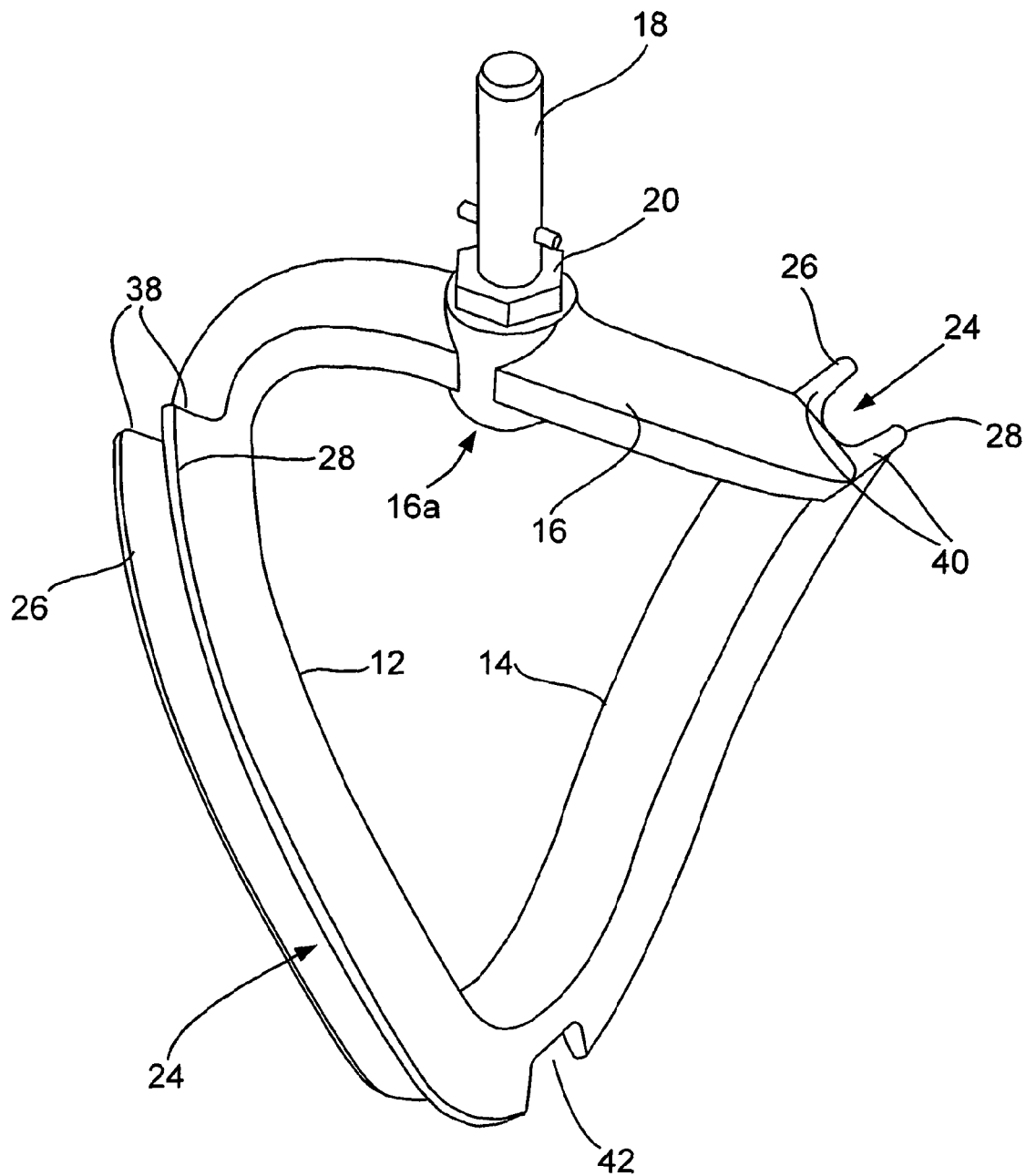
FIG. 2 shows arm members and a transverse member integrally formed to create a framework of the beater assembly.
Figure 3:
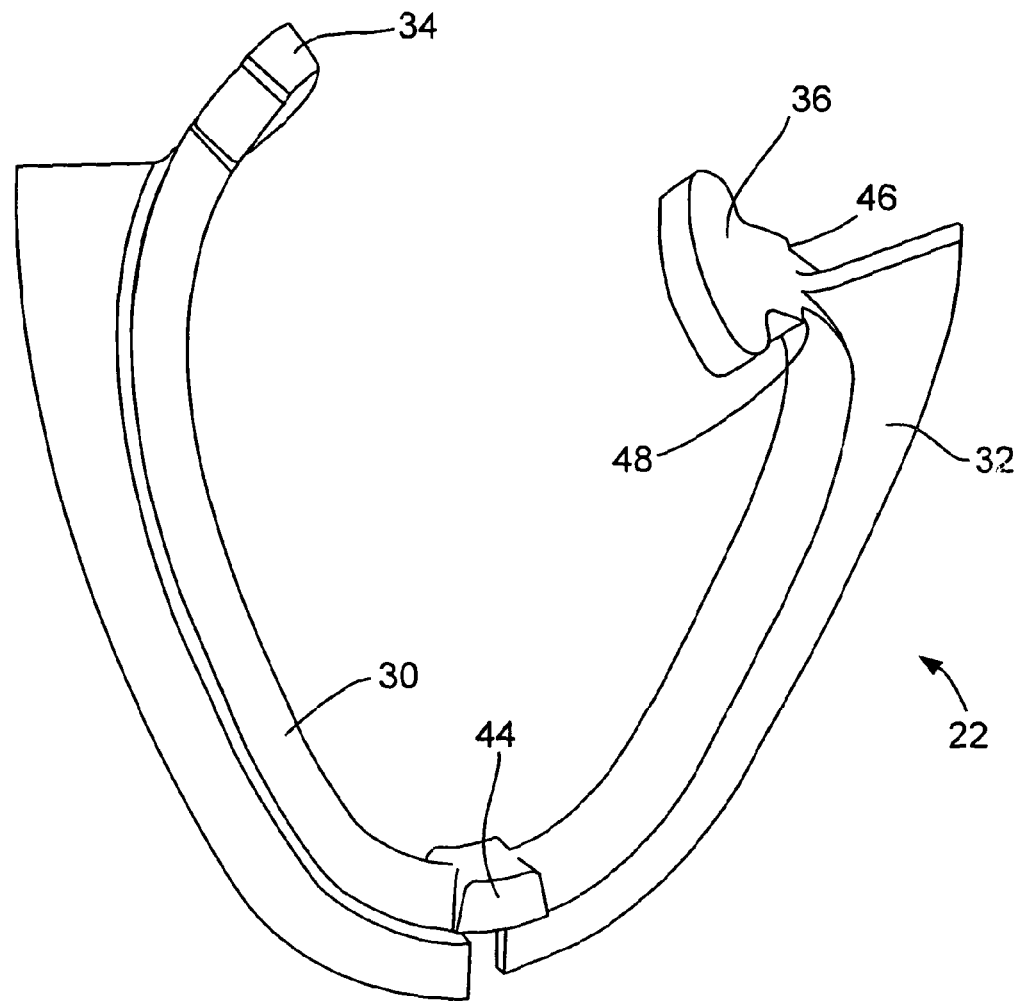
FIG. 3 shows a blade member of the beater assembly.
Figure 4:
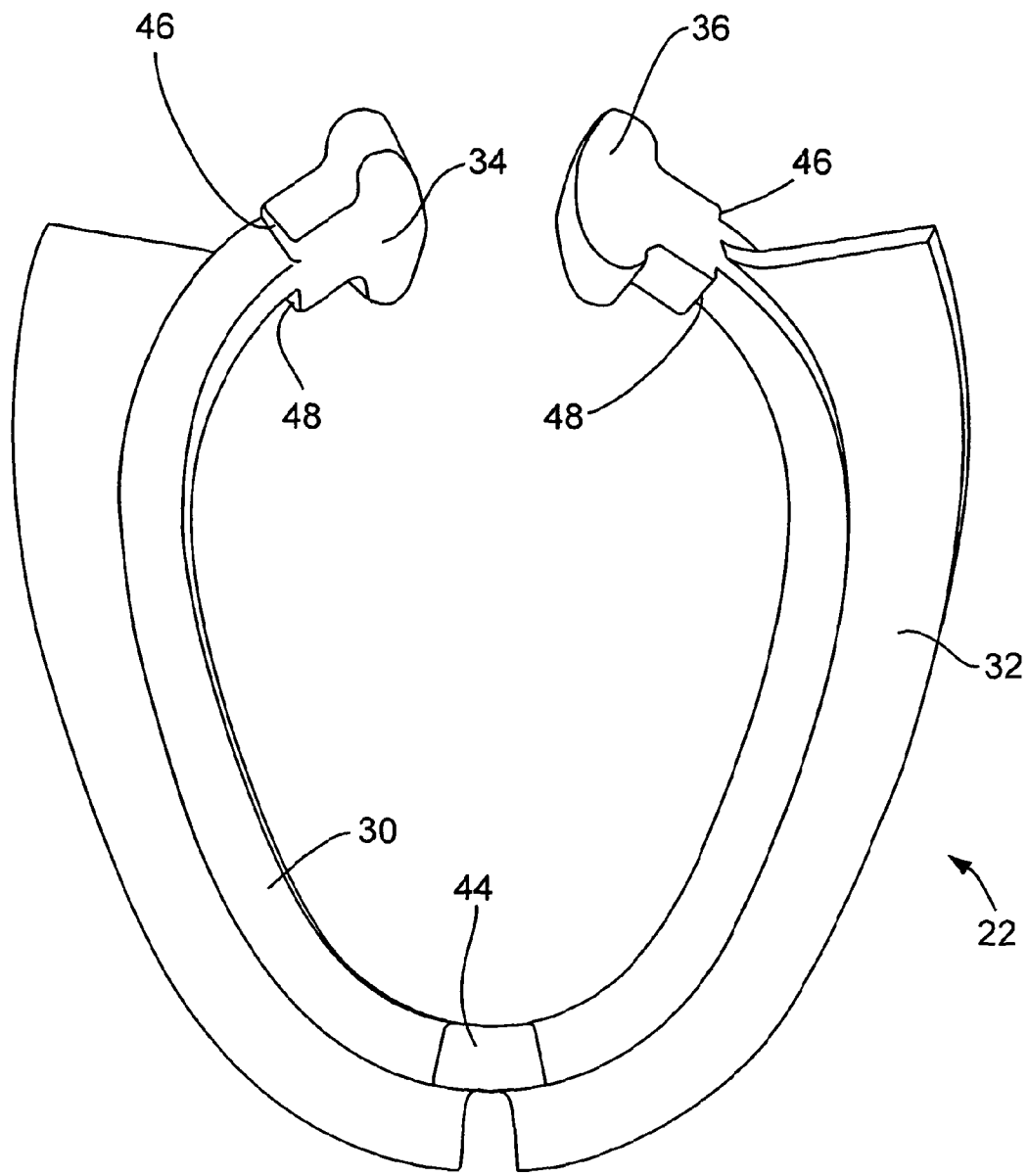
FIG. 4 shows another view of the blade member.
Figure 5:
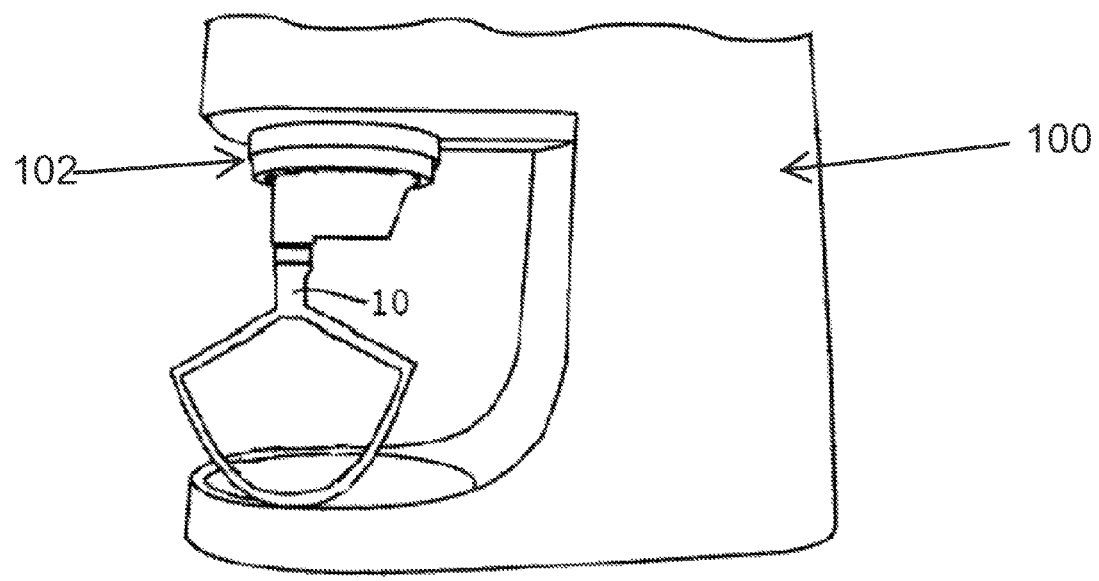
FIG. 5 shows schematically the beater assembly in a stand mixer with planetary drive.

In order to accommodate the wiping member 22, the arm members 12 and 14 are formed, as shown in FIG. 2, with a continuous groove 24 formed as a U-shaped channel section, and defined by upstanding walls 26 and 28. As shown in FIGS. 3 and 4, the wiping member 22 comprises a thickened root portion 30, shaped and dimensioned to fit snugly into the groove 24, and an outwardly extending wiper blade 32 which is thinner than the root portion and can flex as it wipes against the internal bowl surface.

The member 22 is resilient length-wise and can be stretched into position and, when properly anchored to the arm members 12 and 14, is held in place by its own resilience;

the groove 24 following a smooth, curved path along the arms 12 and 14 to avoid causing damage to the elastomeric wiping member 22.

As described thus far, therefore, the beater assembly comprises first and second arm members 12 and 14, intended to depend into a mixing bowl, and each configured so as to substantially follow the shape of the upright wall of the bowl; the arm members 12 and 14 joining near the base of the bowl. The assembly further comprises a transverse member 16 linking the non-adjoined ends of the arm members 12 and 14, and supporting a shaft 18 configured for temporary attachment to the planetary drive outlet of a stand mixer. The arm members 12 and 14 are grooved (as at 24) along their length and the assembly further comprises a blade member 22, formed of a length-wise resilient elastomer and configured for self-retained, elastic mounting in the groove.

In this example, the stronger root portion 30 of the blade member 24 is formed with tab-like fasteners 34 and 36 at its ends, whereby the blade member 22 can be secured to the arm members 12 and 14 by interlocking of the fasteners 34 and 36 with respective anchorage points 38 and 40 formed by shaping the ends of the walls 26 and 28 of the groove 22. Preferably the ends of the walls 26 and 28 are formed at 38 and 40 with a slight undercut to improve retention of the fasteners 34 and 36 respectively.

This arrangement provides all of the benefits of a wiping beater and additionally permits the blade member to be readily removed for cleaning or replacement. Moreover, all parts of the assembly may be cleaned in a dishwasher or by hand. The simple and convenient anchoring means is effective to hold the blade member 22 in tension, stretched along the arms 12 and 14 and with its root portion 30 snugly located in the groove 24.

The ready removal and replacement of the blade member 22 not only facilitates cleaning of the separate components and the economic replacement of worn or damaged blade members, but also permits the use, with the same framework 12, 14, 16, of alternative blade members having wiper blades with differing characteristics, designed for use with, say, mixtures of widely different stiffness and/or with bowls made of different materials. Blade members intended for different applications may with advantage be made visually distinct from one another; for example by colour coding, to aid user differentiation.

It is preferred that the wiping blade part 32 of the blade member 22 is split, substantially centrally of the blade member's length, to more readily accommodate opposing flexure forces applied to the first and second arms 12 and 14 of the beater during use.

In this embodiment of the invention, at least a major portion of the wiping part 32 of the blade member 22 is about 3.0 mm thick and about 10 mm long and, in practice, it is generally preferred to use or exceed these dimensions. Blades of such thickness exhibit surprisingly good wear and damage resistance, and blades of such length conform well to variations in the bowl profile, as well as providing a substantial creaming surface.

As has been previously mentioned, it is considered that the use of such dimensions is inventive of itself and, accordingly, a further and independent feature of the invention provides for the incorporation, into beater assemblies generally, of blade members having wiping parts major portions at least of which conform to such dimensions. It will be appreciated that blade members having wiping parts with at least a major portion conforming to such dimensions can be used to significant advantage irrespective of how the blade members are applied and secured to the arm members. For example, blade-like wiping members that are over-moulded onto arm members can benefit from conformance with the dimensions recited herein, provided that such dimensions are adhered to over at least a major portion of the blade member's wiping part.

Returning now to the particularly preferred form of the invention shown in the drawings, the walls 26 and 28 defining the groove 24 in the arm members 12 and 14 are cut away where the arm members join to form a shaped cut-out 42, and the root portion 30 of the blade member 24 is thickened, substantially centrally of the length of said blade member, as shown at 44, in a shape conforming to, and adapted to locate within, the cut-out 42. This expedient is intended to provide a central location point to assist the user when fitting the blade member 22 to the arms 12 and 14, but may be omitted if desired. The cut-out 42 and the thickening 44 at the root 30 of the blade member 24 (if provided) may conveniently conform to a keystone-like shape.

In the present example of the invention, as described above, the anchoring points for the blade member 22 are constituted by undercut terminations of the walls 26 and 28 defining the groove 22 in the arm members 12 and 14, and the fasteners on said blade member 22 comprise tab-like terminations 34 and 36, extending from the root portion 30 of the blade member 22. The terminations 34 and 36 are formed with lateral walls such as 46 and 48, and shaped to engage with the undercut terminations 38 and 40 of the walls 26 and 28 to hold the blade member 22 in tension, stretched along the groove 24 and with its root portion 30 snugly located therein.

In alternative embodiments, the anchorage points may comprise hook members formed on the arm members 12 and 14 or on said transverse member 16, and the fasteners may comprise apertured tab-like members extending from the root portion 30 of the blade member 22, such that the apertured tab members can be fitted over the hook members to anchor the ends of the blade member 22, thereby to hold the blade member in tension, stretched along the groove 24 with its root portion 30 snugly located therein.

The shaft 18 for driving the beater assembly may be integrally formed with the transverse member. Preferably, however, and as described above, the transverse member 16 is formed at 16a with a centrally located fitment, such as a screw-threaded socket, into which the shaft 18 can be fitted and secured.

The beater assembly may be substantially flat in profile (i.e. the centre line of the groove 24 may lie in a single plane), but it is preferred that the arm members 12 and 14 are azimuthally twisted, as shown in FIGS. 1 and 2, as this enhances the performance of the assembly in terms of encouraging ingredients that might otherwise escape upwards from the bowl area swept by the blade member 22, to move downwards for reincorporation into the mixture.

Where azimuthally twisted arm members 12 and 14 are used, it is preferred to form the blade member 22 flat, and to rely upon its resilience to enable it to conform to the required azimuthal shape upon attachment to the arm members 12 and 14. The blade member 22 may be pre-shaped however, if desired, or if necessary to ease conformance to the azimuthal shape.

It will be noted that, unlike conventional beater assemblies, the assembly exemplified herein has no cross-bracing members between the arms 12 and 14. An advantage of this open-framework construction is that the assembly afforded thereby is easier to clean. Moreover, cross-braces tend, when moving through the mixture to undesirably collect ingredients, meaning that the user has to stop processing from time to time to scrape the beater clean. This disadvantage is avoided by means of the open-framework construction used in this example of the beater assembly.

The invention claimed is:

1. A beater assembly for beating ingredients contained in a bowl; wherein the beater assembly is supported under a planetary drive outlet of a stand mixer, the beater assembly comprising first and second arm members positionable into a bowl, and each configured so as to substantially follow the shape of an upright wall of a bowl; the arm members being further configured to adjoin near the base of a bowl, and the assembly further comprising a transverse member linking the non-adjoined ends of the arm members and supporting a shaft configured for temporary attachment to the planetary drive outlet of the stand mixer; the arm members being grooved along their length and each being provided with a respective anchor means near its junction with said transverse member; and wherein the assembly further comprising an elongated blade member formed of a length-wise resilient elastomer and configured for mounting in said groove; the blade member comprising a thick root portion, configured to sit snugly in said groove, and an outwardly extending wiping part, of thinner profile than the thick root portion, formed to repeatedly flex when wiped against the interior wall of the bowl during a planetary mixing motion, and the blade member further comprising fasteners at its ends and extending from said thick root portion whereby the blade member can be secured to said arm members by interlocking of said fasteners with said anchor means with the blade member held in tension, stretched along the groove; the retention of said blade member in said groove thereby being enhanced by the length-wise resilience of said elastomer.

2. An assembly according to claim 1, further provided with one or more alternative blade members with differing characteristics, intended for different applications.

3. An assembly according to claim 2, wherein blade members intended for different applications are visually distinct, for example colour coded, to aid user differentiation.

4. An assembly according to claim 1, wherein the first and second arm members and the transverse member are made from a plastics material.

5. An assembly according to claim 1, wherein the first and second arm members and the transverse member are made from metallic material.

6. An assembly according to claim 1, wherein the first and second arm members and the transverse member are integrally formed.

7. An assembly according to claim 1, wherein at least a major portion of the wiping part of the blade member has a thickness of 3.0 mm or more and a length of 10.0 mm or more.

8. An assembly according to claim 1, wherein the wiping part of the blade member is split, substantially centrally of the blade member's length, to more readily accommodate opposing flexure forces applied to the first and second arms of the beater assembly during use.

9. An assembly according to claim 8, wherein walls defining the groove in said first and second arm members are cut away at or near the adjoined ends of said arm members to form a shaped cut-out, and said thick root portion of the blade member is thickened, substantially centrally of the length of said blade member, in a shape conforming to, and adapted to locate within, said cut-out.

10. An assembly according to claim 9, wherein said cut-out conforms to a keystone-like shape.

11. An assembly according to claim 1, wherein the anchor means comprise undercut terminations of walls defining the groove in the first and second arms, and the fasteners on said blade member comprise tab-like terminations extending from said thick root portion and formed with lateral walls shaped to engage with said undercut terminations of the walls to hold the blade member in tension, stretched along said groove with its thick root portion snugly located therein.

12. An assembly according to claim 1, wherein the anchoring means comprises hook members formed on the first and second arm members or on said transverse member, and the fasteners comprise apertured tab-like members extending from said thick root portion of the blade member, such that the apertured tab members can be fitted over the hook members to anchor the ends of the blade member, thereby to hold the blade member in tension, stretched along said groove with its thick root portion snugly located therein.

13. An assembly according to claim 1, wherein the transverse member is formed with a fitment into which said shaft for driving the beater assembly can be fitted and secured.

14. An assembly according to claim 1, wherein said shaft for driving the beater assembly is integrally formed with the transverse member.

15. An assembly according to claim 1, wherein the arm members are azimuthally twisted to encourage ingredients that might otherwise escape upwards from the bowl area swept by the blade member to move downwards for reincorporation into the mixture.

16. An assembly according to claim 15, wherein the blade member, prior to its fitment to the arm members, is substantially flat and wherein the resilience of said blade member enables it to conform to an azimuthal shape upon attachment to the arm members.

17. An assembly according to claim 1, wherein the beater assembly is substantially flat in profile, whereby the centre line of said groove lies in a single plane.

18. An assembly according to claim 1, formed as an open framework without cross-bracing members between the arm members.

19. An assembly according to claim 4, wherein the plastics material is polymer.

20. An assembly according to claim 5, wherein the metallic material is stainless steel.

* * * * *